(12) United States Patent
Tokuchi (10) Patent No.: US 10,802,591 B2
(45) Date of Patent: Oct. 13, 2020

(54) INFORMATION PROCESSING DEVICE AND NON-TRANSITORY COMPUTER READABLE MEDIUM STORING PROGRAM (71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 52 days.

(21) Appl. No.: 16/121,936

(22) Filed: Sep. 5, 2018

(65) Prior Publication Data
US 2019/0272033 A1 Sep. 5, 2019

(30) Foreign Application Priority Data
Mar. 2, 2018 (JP) ................. 2018-037041

(51) Int. Cl.
G06F 3/01 (2006.01)
G09B 21/00 (2006.01)
G06F 3/0488 (2013.01)

(52) U.S. Cl.
CPC .......... *G06F 3/016* (2013.01); *G06F 3/04883* (2013.01); *G09B 21/003* (2013.01); *G06F 2203/04808* (2013.01)

(58) Field of Classification Search
CPC .............. G06F 3/016; G06F 3/04883; G06F 2203/04808; G06F 3/04886; G09B 21/003
See application file for complete search history.

(56) References Cited

U.S. PATENT DOCUMENTS

| 9,201,503 B2 | 12/2015 | Miyauchi | |
| 2009/0167702 A1* | 7/2009 | Nurmi | G06F 3/0346 345/173 |
| 2015/0116205 A1* | 4/2015 | Westerman | G06F 3/0414 345/156 |
| 2016/0283105 A1* | 9/2016 | Maloo | G06F 3/04886 |
| 2017/0351370 A1* | 12/2017 | Oh | G06F 21/32 |

FOREIGN PATENT DOCUMENTS

| JP | 5373467 B2 | 12/2013 |
| JP | 5862271 B2 | 2/2016 |

* cited by examiner

Primary Examiner — Muhammad N Edun
(74) Attorney, Agent, or Firm — Oliff PLC (57) ABSTRACT An information processing device includes a receiving unit that receives an operation of a user only when a direction of force applied to a display is a predetermined specific direction.

19 Claims, 7 Drawing Sheets

| DIRECTION OF FORCE | OPERATION DIRECTION | FUNCTION |
|---|---|---|
| LEFT | UP | A4 PRINT |
| | DOWN | A3 PRINT |
| | LEFT | DOUBLE-SIDED PRINT |
| | RIGHT | COLOR PRINT |
| RIGHT | UP | STAPLE |
| | DOWN | |
| | LEFT | |
| | RIGHT | |
| UP | UP | SCAN |
| | DOWN | SCAN TO MAIL |
| | LEFT | — |
| | RIGHT | — |
| UP | ROBOT IMAGE | COORDINATION FUNCTION 1 WITH ROBOT |
| DOWN | | COORDINATION FUNCTION 2 WITH ROBOT |
| LEFT | | COORDINATION FUNCTION 3 WITH ROBOT |
| RIGHT | | COORDINATION FUNCTION 4 WITH ROBOT |

FIG. 11

INFORMATION PROCESSING DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-037041 filed Mar. 2, 2018.

BACKGROUND

(i) Technical Field

The present disclosure relates to an information processing device and a non-transitory computer readable medium storing a program.

(ii) Related Art

It has become common to input various types of information and operate displayed information by operating a touch panel of a smartphone or a tablet terminal with a finger. For instance, a user can provide various instructions to a smartphone or the like by performing operations called a tap, flick, swipe pinch-in and pinch-out according to movement of one or two fingers.

Related techniques are disclosed in, for example, Japanese Patent Nos. 5373467 and 5862271.

SUMMARY

Aspects of non-limiting embodiments of the present disclosure relate to determine an operation to be received based on a direction of force which is applied to a display.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing device including a receiving unit that receives an operation of a user only when a direction of force applied to a display is a predetermined specific direction.

BRIEF DESCRIPTION OF THE DRAWINGS

Exemplary embodiments of the present disclosure will be described in detail based on the following figures, wherein.

DETAILED DESCRIPTION

Hereinafter, an exemplary embodiment of the present disclosure will be described with reference to the drawings.

First Exemplary Embodiment

Figure 1:
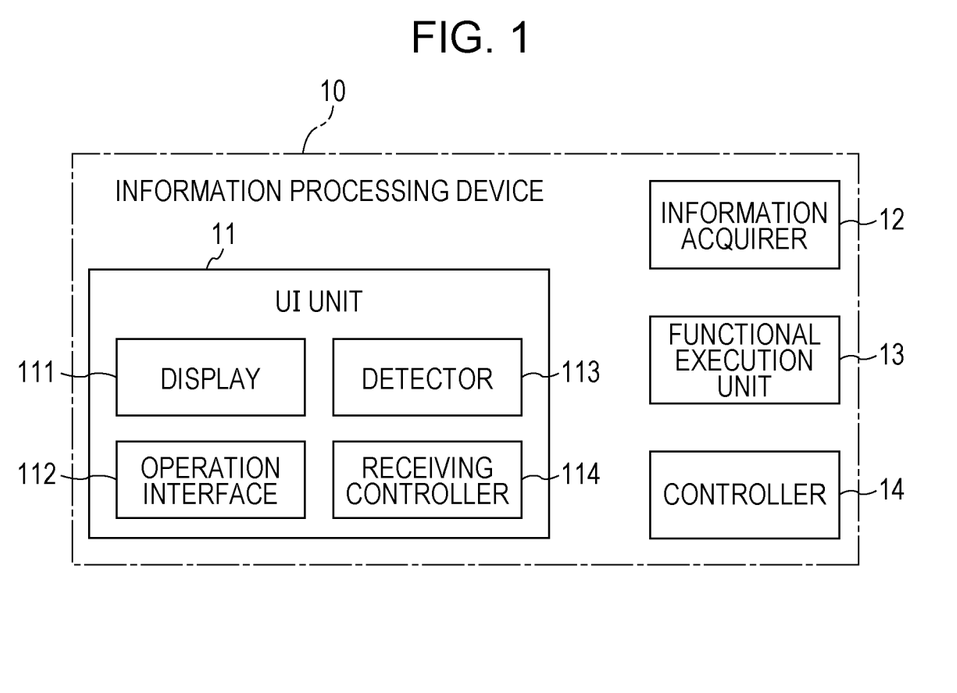
FIG. 1 is a block configuration diagram illustrating an exemplary embodiment of an information processing device according to the present disclosure.

FIG. 1 is a block configuration diagram illustrating an exemplary embodiment of an information processing device 10 according to the present disclosure. The information processing device 10 according to the exemplary embodiment is equipped with a touch panel that allows various types of information to be inputted and displayed information to be operated by displaying an image and being operated with an operator. The "operator" is used when some operation is performed by pointing out an image displayed on a touch panel or part of the image. The operator may be used to simply pointing out a portion of an image without performing any operation. The operator is an object for operating an image, for instance, a human fingertip and a pen used by a human. In the exemplary embodiment, a description is given using an example of a human fingertip as an operator unless otherwise stated.

Figure 2:
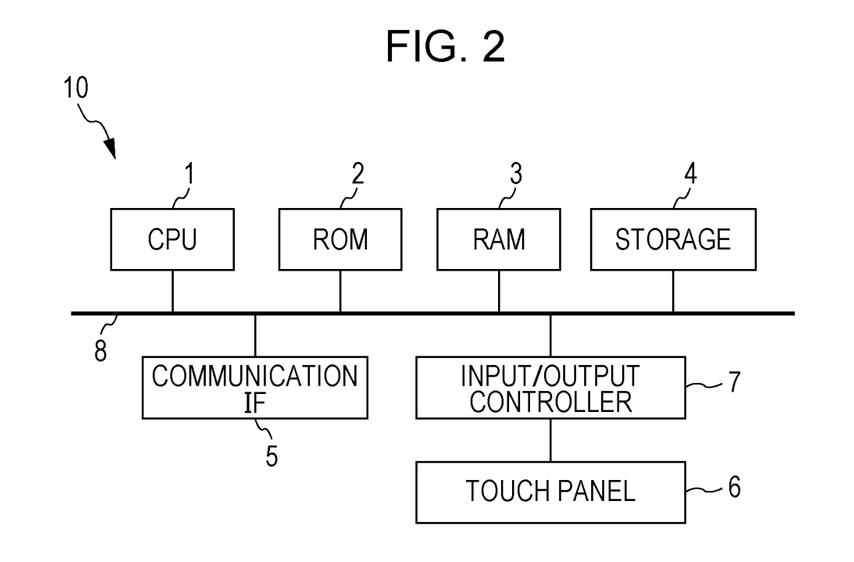
FIG. 2 is a hardware configuration diagram of the information processing device in a first exemplary embodiment.

FIG. 2 is a hardware configuration diagram of the information processing device 10 in the exemplary embodiment. In the exemplary embodiment, the information processing device 10 is a computer or a device equipped with a computer, and can be implemented by a pre-existing general-purpose hardware configuration. Specifically, as illustrated in FIG. 2, a computer is configured by connecting a central processing unit (CPU) 1, a read-only memory (ROM) 2, a random access memory (RAM) 3, a storage 4 serving as a storage unit, such as a hard disk drive (HDD) or a solid state drive (SSD), a communication interface (IF) 5 provided as a communication unit, and an input/output controller 7 connected to a touch panel 6 to an internal bus 8.

Returning to FIG. 1, the information processing device 10 includes a user interface (UI) unit 11, an information acquirer 12, a functional execution unit 13, and a controller 14. It is to be noted that any component not used for describing the exemplary embodiment is omitted from the drawings. The UI unit 11 includes a display 111, an operation interface 112, a detector 113, and a receiving controller 114. The display 111 and the operation interface 112 are implemented by the touch panel 6. The display 111 displays an image on the touch panel 6. The operation interface 112 receives input of a user operation to the touch panel 6. The detector 113 and the receiving controller 114 are implemented by the input/output controller 7. The detector 113 detects an angle of a fingertip when the fingertip is in contact with the touch panel 6. Also, the detector 113 detects a direction of force applied to the touch panel 6 by a fingertip according to the angle of a fingertip. The receiving controller 114 controls whether the user operation to the touch panel 6 is received. Specifically, the user operation is received only when the direction of force applied by a fingertip, detected by the detector 113 is a predetermined specific direction. The "predetermined specific direction" does not identify a direction, in other words, multiple directions may be the specific direction. The information acquirer 12 acquires information used for display from the storage 4 or the outside via the communication IF5 according to the user operation. The functional execution unit 13 executes a function designated by a user operation. The controller 14 controls the operation of the components 11 to 13. For instance, the controller 14 controls a function to be executed by the functional execution unit 13, according to an operation received by the UI unit 11.

The components 11 to 14 in the information processing device 10 are implemented by cooperative operations between a computer that comprises the information processing device 10, and programs which are executed by the CPU1 mounted in the computer. Also, it is possible to provide each program used in the exemplary embodiment by a communication unit first of all, and also by storing the program in a computer readable recording medium, such as a CD-ROM and a USB memory. A program provided from a communication unit or a recording medium is installed in a computer, and various types of processing are implemented by the CPU1 of the computer sequentially executing the program.

Meanwhile, a user performs an operation by touching the touch panel 6 with a fingertip (for instance, a selection operation), and before the operation in the exemplary embodiment is described, the user operation to the touch panel 6, particularly, the angle of a fingertip when in contact with the touch panel 6, and the direction of force applied to the touch panel 6 by a fingertip will be described.

For instance, when a user operates the touch panel 6 of a smartphone, it is not always the case that a user operates the touch panel 6 by touching it in a perpendicular direction (from right above a contact position) to the touch panel 6. The angle of a fingertip when in contact with the touch panel 6 often depends on the positional relationship between a hand or the body of a user and the touch panel 6. For instance, on the assumption that a smartphone, which is held by the left hand and in front of the left shoulder, is operated with the right hand, it is clear that a fingertip of the right hand probably touches the touch panel 6 not from the right above (in the perpendicular direction to the screen) the touch panel 6, but in a direction from the right with the finger tilted to the right. Although it is possible for a user to operate a smartphone with the finger tilted in a different direction by bending the wrist, such an operation has to be performed intentionally.

Figure 3:
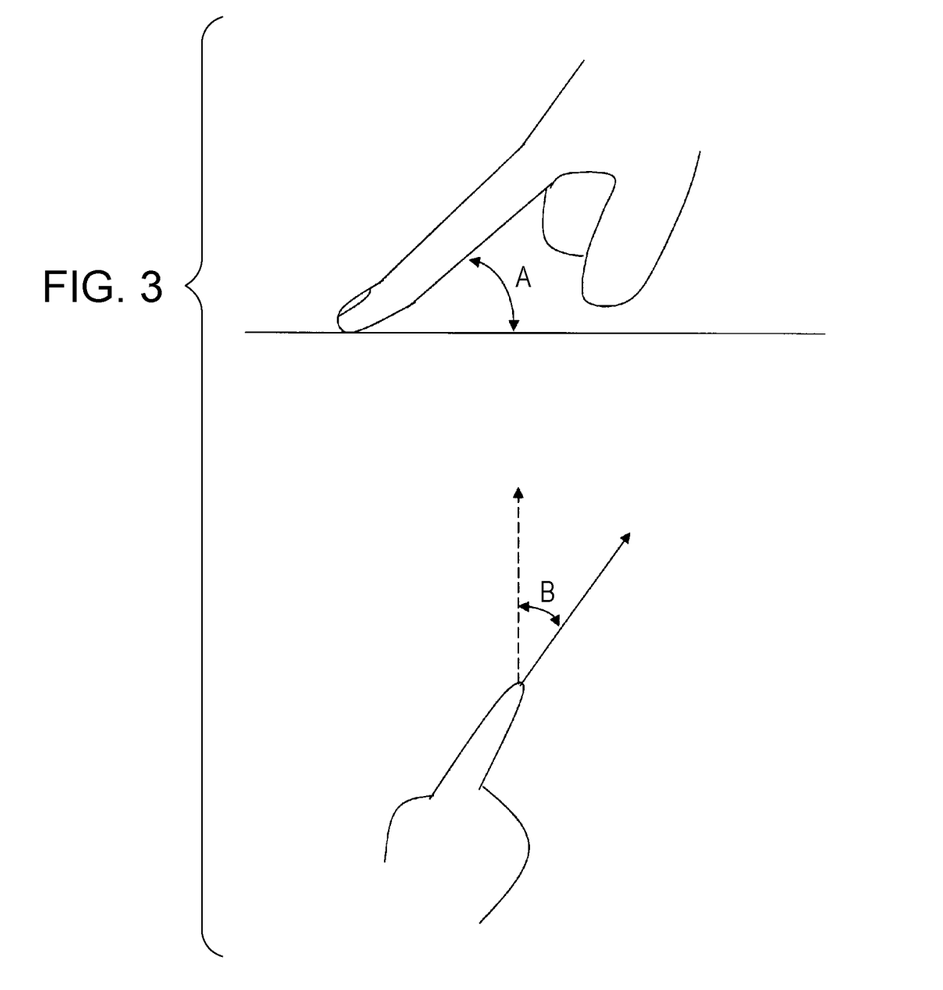
FIG. 3 is a conceptual illustration for explaining an angle and a direction of an operation by a fingertip.

The detector 113 detects an angle when a fingertip of a user is in contact with the touch panel 6 mentioned above. As illustrated in FIG. 3, angles detected by the detector 113 include an angle A with respect to the surface (horizontal direction) of the touch panel 6, and a rotation angle B of a fingertip in a clockwise direction, for instance when the upper side (upper direction) of the touch panel 6 serves as a reference position (reference axis). Both the direction of force and the operation direction are detectable by the rotation angle B.

Figure 4:
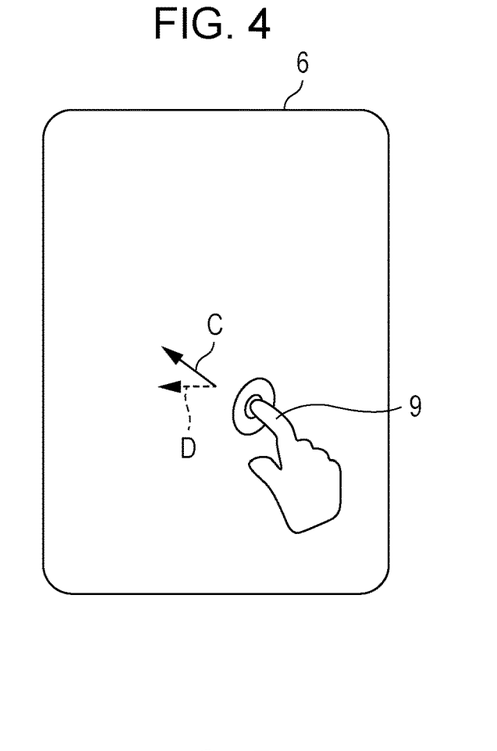
FIG. 4 is a conceptual illustration for explaining a force applied to a touch panel by a fingertip.

Also, the direction of a fingertip when in contact with the touch panel 6 and the direction of force applied to the touch panel 6 by a fingertip are normally match unless a user operates the wrist intentionally. FIG. 4 is a conceptual illustration depicting a state in which a user touches the touch panel 6. For instance, when a user moves the fingertip not in a perpendicular direction to (from right above) the touch panel 6, but in the direction from the right to the upper left and touches the touch panel 6 as indicated by a solid line arrow C, a force in the upper left direction is probably applied to the touch panel 6. Thus, the force applied to the touch panel 6 by the fingertip 9 contains a leftward vector component as indicated by a dashed line arrow D. Conversely, when a user touches the touch panel 6 with the fingertip 9 from the left direction, the force applied to the touch panel 6 by the fingertip 9 contains a rightward vector component. The same goes with when a user touches the touch panel 6 in a vertical direction or in another direction.

As described above, in the case where the angle of a fingertip when in contact with the touch panel 6 is detectable, the direction of force applied to the touch panel 6 by the fingertip is also detectable. Therefore, the detection unit 113 may be implemented by a unit that detects the angle of a fingertip when in contact with the touch panel 6. However, the direction of force applied to the touch panel 6 may be separately measured using a sensor unit such as a pressure gauge.

Hereinafter the operation in the exemplary embodiment will be described based on the angle of a fingertip when in contact with the touch panel 6 and the direction of force applied to the touch panel 6 by the fingertip described above. First, the basic operation in the exemplary embodiment will be described.

A user performs an operation by touching the touch panel 6, and a characteristic feature in the exemplary embodiment is that an operation with a fingertip is received only when the direction of force applied to the touch panel 6 by the fingertip is a predetermined specific direction. For instance, the receiving controller 114 is configured to perform control such that when a user touches the touch panel 6 with a fingertip to perform some operation, the operation is received only when the direction of force applied to the touch panel 6 by the fingertip is leftward as a predetermined specific direction. In addition, the receiving controller 114 is configured to change the direction of force to be received as appropriate. Under such setting conditions, when a user touches the touch panel 6 in the direction from the right, the detector 113 detects that the direction of force applied to the touch panel 6 by the fingertip is leftward. Thus, since the direction of the force of the operation is leftward, the receiving controller 114 determines that the operation is a valid operation, and receives the operation. when the direction of the force detected by the detector 113 is other than leftward, the receiving controller 114 determines that the operation is an invalid operation, and does not receive the operation.

Although the direction of force may be limited to leftward as in this example, it is not always the case that a user strictly moves a fingertip in a direction from the right to the left, thus an acceptable range may be given so that an operation may be received, for instance when the force applied to the touch panel 6 by the fingertip 9 contains a rightward vector component as described above. However, for the sake of explanation, a description is given below under the assumption that the direction of force is limited to the upper, lower, leftward, or rightward direction. The direction of force received by the receiving controller 114 is not necessarily limited to one direction, and the receiving controller 114 may perform control to receive multiple directions of force.

Figure 5:
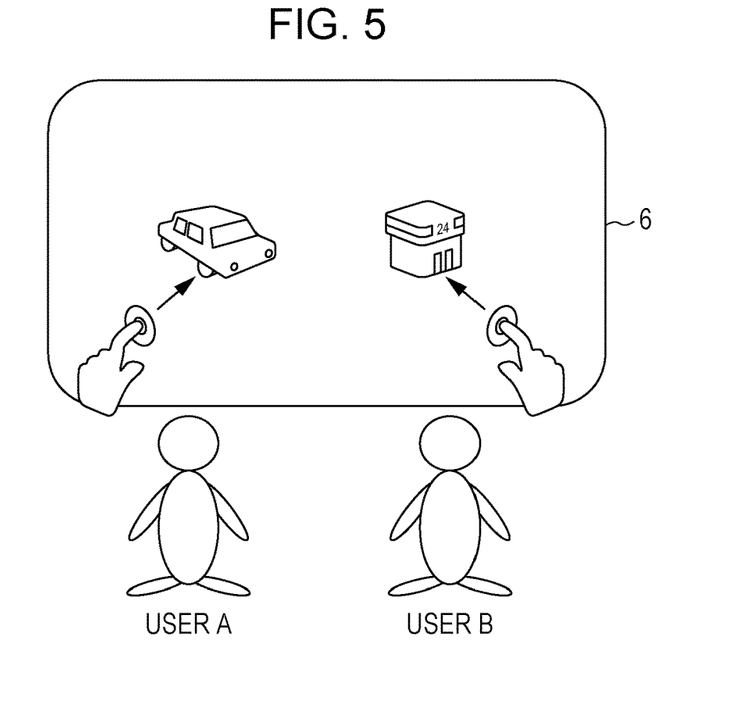
FIG. 5 is a view illustrating an example of a display screen when an image is displayed on a touch panel in the first exemplary embodiment.

FIG. 5 is a view illustrating an example of a display screen when an image is displayed on the touch panel 6. The touch panel 6 used here is formed by a big screen which can be simultaneously operated by multiple users. Two users A, B are standing in front of the touch panel 6 (hereinafter referred to as the "screen"). The user A is standing on the left side of the user B, that is, on the left from the center of the screen. Thus, the user B is standing on the right side of the user A, that is, on the right from the center of the screen.

For instance, it is assumed that the users A, B utilize the touch panel 6 when having a discussion. In this case, it may be presumed that the user A faces the user B, and the user B faces the user A while having a discussion. Therefore, when the user A operates the touch panel 6, the direction of force applied to the touch panel 6 by the fingertip for the operation is probably rightward. More particularly, the force probably contains a rightward vector component. Similarly, when the user B operates the touch panel 6, the force applied to the touch panel 6 by the fingertip for the operation probably contains a leftward vector component.

In the information processing device 10 having a touch panels 6 which can be utilized by multiple users concurrently, the entire screen may not be handled in a uniform manner, but may be divided into multiple areas, and validity of an operation may be determined for each of the areas by setting the direction of force to be received for each area. For instance, when the two users A, B utilize the touch panel 6 as illustrated in FIG. 5, the area of the screen is divided into the right and left corresponding to the users. Then, the setting is made for the left side (user A) of the screen such that only an operation with force in a rightward direction is received. On the other hand, the setting is made for the right side (user B) of the screen such that only an operation with force in a leftward direction is received. For the user A who is facing the user B, the direction of force applied to the touch panel 6 by the fingertip for the operation is rightward, thus when the direction of force to be received is set as described above, an operation performed by the user A on the left side of the screen is received. However, even when the user A tries to perform an operation on the right side of the screen, the operation is not received because the direction of the force of the operation is rightward. Similarly, for the user B who is facing the user A, the direction of force applied to the touch panel 6 by the fingertip for the operation is leftward, thus when the direction of force to be received is set as described above, an operation performed by the user B on the right side of the screen is received, whereas an operation by the user B on the left side of the screen is not received.

Although the direction of the force of an operation to be received is set for the area on the touch panel 6 in the exemplary embodiment, the direction of the force of an operation to be received may set for information (such as an image, a text character) displayed on the touch panel 6, for instance.

Here, a description has been given using an example in which one touch panel 6 is operated by multiple users. In other words, multiple operators (fingertips) are associated with the users. However, one user may use multiple operators, for instance, a right fingertip and a left fingertip as the operators. Although the screen is divided corresponding to the users in the description above, the direction of force to be received may be set corresponding to information to be displayed without simply dividing the screen into areas.

Also, although a description has been given using an example in which individual users operate the touch panel in the description above, the receiving controller 114 may perform control to receive the operations by multiple users A, B only when the users A, B concurrently perform proper operations (when each user performs an operation on a predetermined area with the direction of force matching a predetermined specific direction), for instance.

Figure 6:
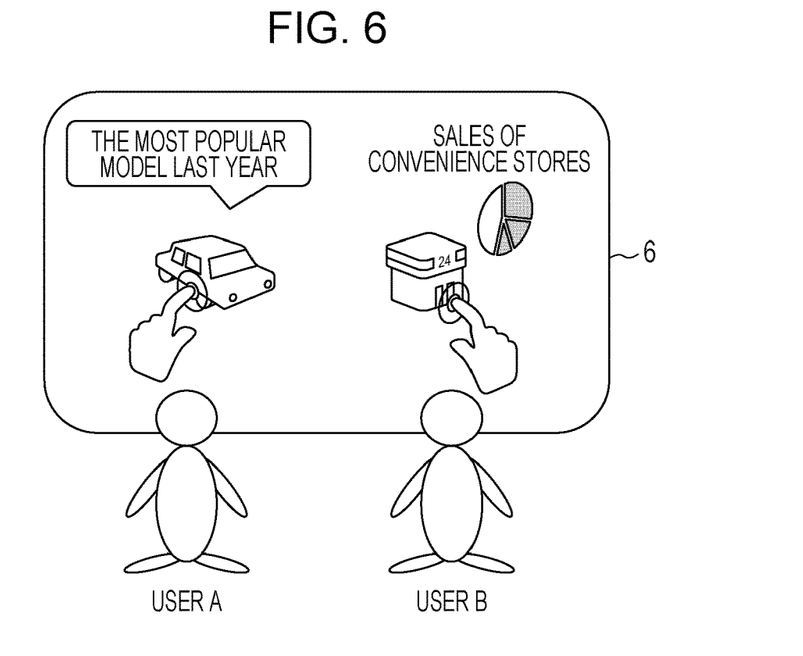
FIG. 6 is a view illustrating an example of a display screen after an operation of a user in FIG. 5.

FIG. 6 is a view illustrating a display example of the touch panel 6 when the user A touches the touch panel 6 with a fingertip with a rightward direction of force applied to the touch panel 6, and the user B touches the touch panel 6 with a fingertip with a leftward direction of force applied to the touch panel 6 in FIG. 5. The act of touching the touch panel 6 herein is equivalent to a selection operation.

When the user A touches an image of a vehicle in a predetermined direction of force (in other words, an operation of selecting an image of a vehicle is performed), information related to the vehicle is displayed on the touch panel 6. More particularly, when the direction of force, detected by the detector 113, applied to the touch panel 6 by the fingertip of the user A is rightward as the setting, the receiving controller 114 determines that the operation is valid and receives the operation. When the receiving controller 114 receives the operation, the controller 14 instructs the information acquirer 12 to acquire information in accordance with the instruction operation. Here, the image of each vehicle is associated with a processing function of acquiring information (a popularity ranking in the example illustrated in FIG. 6) on the vehicle when selected, thus the controller 14 instructs the information acquirer 12 to acquire the information. The information acquirer 12 retrieves information related to the vehicle from a predetermined storage in accordance with the instruction from the controller 14. The display 111 of the UI unit 11 displays the information acquired by the information acquirer 12 on the touch panel 6 in accordance with the instruction from the controller 14. Similarly, when the direction of force, detected by the detector 113, applied to the touch panel 6 by the fingertip of the user B is leftward as the setting, the receiving controller 114 determines that the operation is valid and receives the operation. When the receiving controller 114 receives the operation by the user B, the controller 14 instructs the information acquirer 12 to acquire information in accordance with the instruction operation. Here, the image of each store is associated with a processing function of acquiring information (sales information in the example illustrated in FIG. 6) on the store when selected, thus the controller 14 instructs the information acquirer 12 to acquire the information. The information acquirer 12 retrieves information related to the store from a predetermined storage in accordance with the instruction from the controller 14. The display 111 of the UI unit 11 displays the information acquired by the information acquirer 12 on the touch panel 6 in accordance with the instruction from the controller 14.

In the description above, the receiving controller 114 performs control such that when the direction of force of an operation by the user B to a vehicle is different from the set direction of force, the operation is not received. However, the receiving controller 114 may perform different operation control instead of performing control not to receive the operation. For instance, when the direction of force is rightward, information on popularity ranking has been acquired and displayed above. However, when the direction of force is leftward, information different from when the direction is rightward, for instance, sales volume of vehicles may be acquired and displayed. In this manner, operations in different directions of force may be received.

Figure 7:
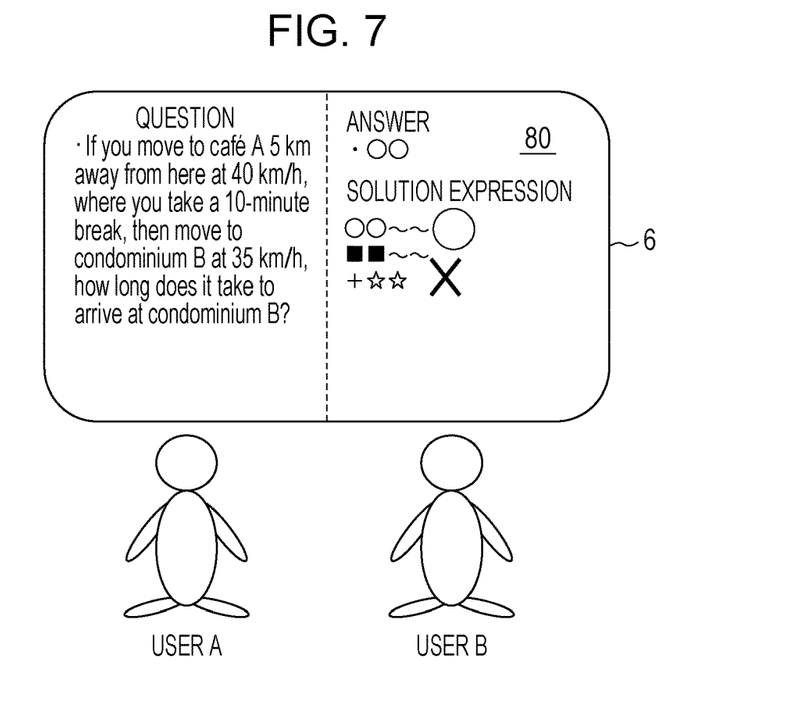
FIG. 7 is a view illustrating another example of a display screen when an image is displayed on the touch panel in the first exemplary embodiment.

FIG. 7 is a view illustrating different use scenes of the information processing device 10. FIG. 7 illustrates an example in which the touch panel 6 is divided into the right and left, a question is displayed on the left side of the screen, and the answer of a student is displayed on the right side of the screen. Here, a description is given under the assumption that a pen is used as an the operator. The divided screen on the right side is assigned a function so that when the direction of force applied to the touch panel 6 by the pen is leftward, it is possible to write in red, when the direction of force applied to the touch panel 6 is rightward, it is possible to write in blue, and when the direction of force applied to the touch panel 6 is upward, displayed contents are stored. In this manner, validity of an operation is determined based on the direction of force applied to the touch panel 6 by a pen. In the example described above, the left, right, and upper directions of force are determined to be valid. In addition, different functions are assigned according to the directions of force.

Here, when a teacher marks an answer, the teacher performs a write operation on the touch panel 6 by tilting the pen so that the direction of force applied to the touch panel 6 is leftward. When the detector 113 detects that the direction of force applied to the touch panel 6 by the pen is leftward, the receiving controller 114 receives the operation. The controller 14 performs control to display the pen's path on the touch panel 6 in red. It is to be noted that the operation of a teacher is a function selection operation, and is different from the operation of selecting an image displayed on the screen, which has been described with reference to FIG. 6.

After marking an answer, a teacher tilts the pen and touches the touch panel 6 with the pen so that the direction of force applied to the touch panel 6 is upward. When the detector 113 detects that the direction of force applied to the touch panel 6 by the pen is upward, the receiving controller 114 receives the operation. the receiving controller 114 then stores answer data marked by the operation into a predetermined storage. In this manner, a teacher can select one of different functions by adjusting the direction of force applied by the pen, that is, the direction (angle) of the pen while in contact with the touch panel 6.

Meanwhile, a user can intentionally control the direction of force by the operator when in contact with the touch panel 6. However, when characters are written on the touch panel 6 at the time of marking an answer, the direction (angle) of the pen while in contact with the touch panel 6 may not be maintained all the time. It is not possible to move the pen rightward while keeping the direction of force applied to the touch panel 6 by the pen leftward in order to display the position (path) in contact with the touch panel 6 in red as illustrated above.

Thus, after the detector 113 detects the angle of the pen when in contact with the touch panel 6, the angle is regarded as the direction (the leftward direction) of a force applied to the touch panel 6 and stored, then it is determined that while the angle is being detected, the direction of force applied when the pen is in contact with the touch panel 6 is maintained. In other words, the receiving controller 114 may determine validity of an operation by regarding the angle of the operator in contact with the touch panel 6 as information indicating the direction of force applied to the touch panel 6 by the operator. Based on the example described above, a teacher touches the touch panel 6 with a pen for marking an answer (for writing in red) with the direction of force applied to the touch panel 6 by the pen leftward. The detector 113 detects the direction of the force, that is, the angle of the pen, and while the detected angle is being maintained, the controller 14 performs control to display the position (path) of the pen on the touch panel 6 in red. Also, it may be difficult to write while maintaining the angle of the pen all the time. Thus, the receiving controller 114 may provide an acceptable range for the angle for which an operation received. Alternatively, after writing in red starts, the position (path) of the pen may be displayed in red until the pen tip separates from the touch panel 6. In this manner, validity of an operation may be determined by the direction of force (the angle of the operator) at the time of operation after the pen separates from the touch panel 6.

Also, the left side of the screen of FIG. 7 is set such that an operation is never received regardless of the direction in which force is applied. Thus, the receiving controller 114 does not receive any operation regardless of the direction of force applied to the touch panel 6 by the pen, thereby making it possible to prohibit the question from being written. In short, falsification of question data can be prevented.

Second Exemplary Embodiment

Figure 8:
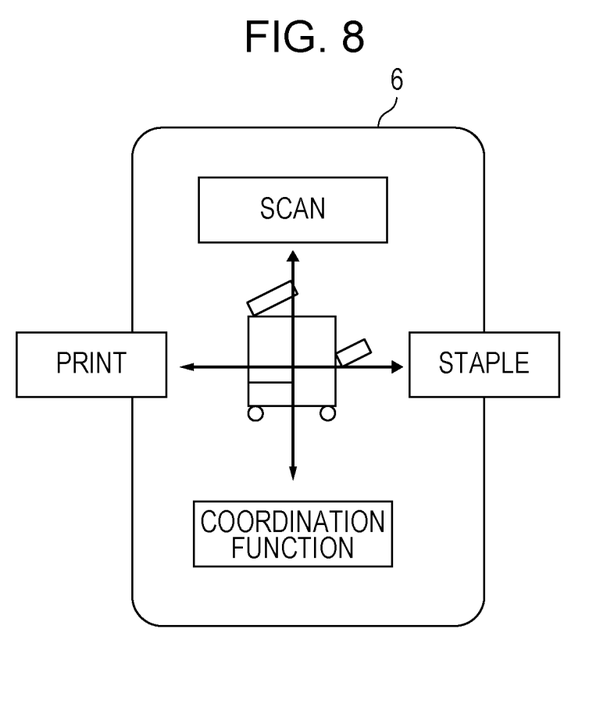
FIG. 8 is a view illustrating an example of a display screen when an image is displayed on a touch panel in a second exemplary embodiment.

FIG. 8 is a view illustrating an example of a display screen of a touch panel 6 of an information processing device 10 in a second exemplary embodiment. In FIG. 8, an image of a multifunctional device is displayed as a device for which the function is to be controlled. The arrows and the characters for explaining the functions in FIG. 8 are information for the sake of description, and do not need to be displayed on the screen.

Figure 9:
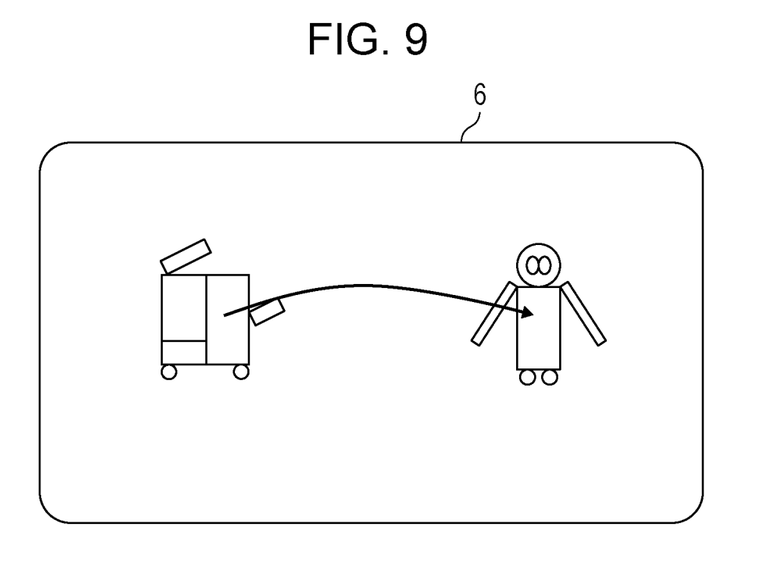
FIG. 9 is a view illustrating another example of a display screen when an image is displayed on the touch panel in the second exemplary embodiment.

FIG. 9 is a view illustrating another example of a display screen of the touch panel 6 of the information processing device 10 in the second exemplary embodiment. FIG. 9 illustrates an image of a robot in addition to the image of a multifunctional device illustrated in FIG. 8.

Figure 10:
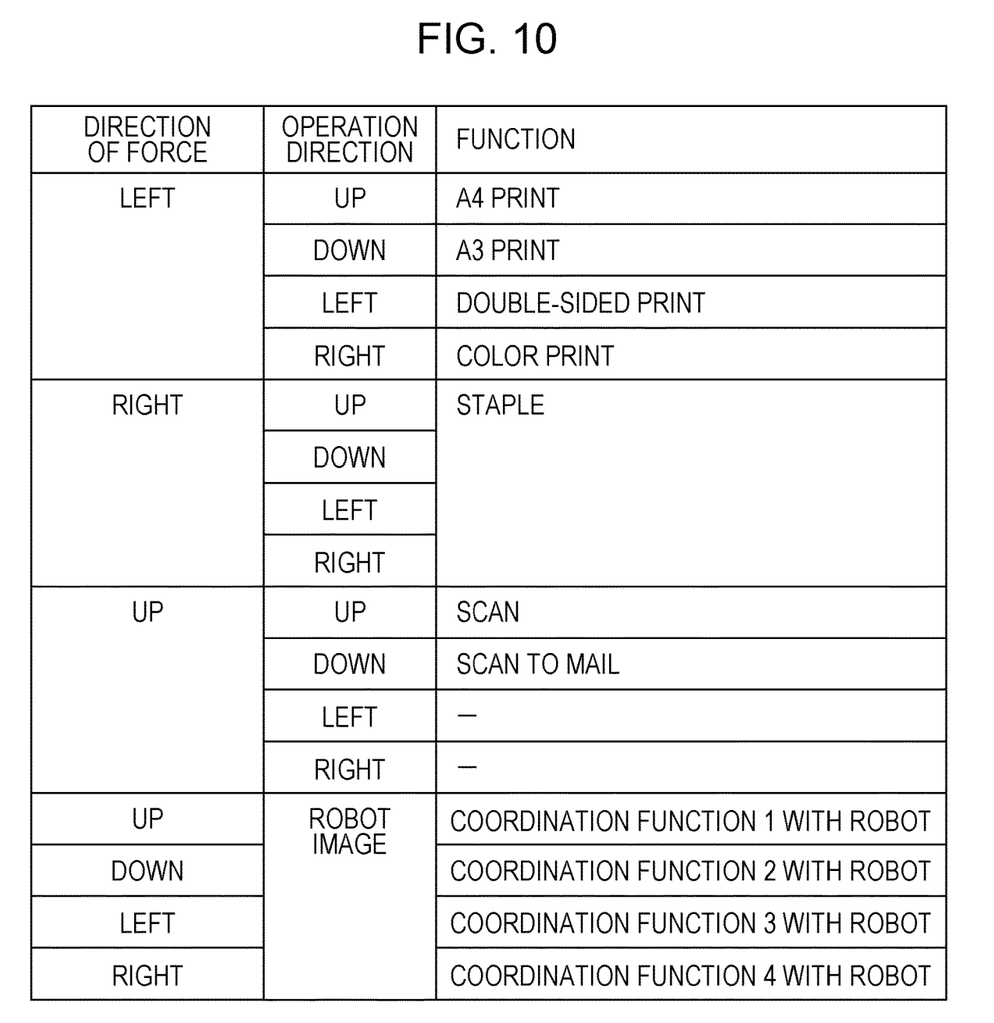
FIG. 10 is a table illustrating function control information in the second exemplary embodiment in a tabular form.

FIG. 10 is a table illustrating the function control information in the second exemplary embodiment in a tabular form. The function control information illustrated in FIG. 10 is generated corresponding to the multifunctional device illustrated in FIGS. 8 and 9. In the function control information, "operation direction" and "function" are set for "direction of force". The "direction of force" is the direction of force applied to the touch panel 6 by a fingertip. As described in the first exemplary embodiment, for instance, when the touch panel 6 is touched with a fingertip in a direction from the right, the direction of force applied to the touch panel 6 by the fingertip is leftward. The "operation direction" is the direction of a fingertip when moved on the touch panel 6 with the angle of the fingertip applying the force in the direction maintained. The "function" is set to a function that is performed when a user performs an operation in the operation direction on an image displayed on the touch panel 6 in the direction (the angle of the fingertip) of the force. As illustrated in FIG. 10, the "function" may be set with a coordination function that implements a series of functions by coordinating a function provided by a multifunctional device and a function provided by a robot.

The function control information illustrated to FIG. 10 is pre-set, and let a user operate the images displayed on the touch panel 6. When the receiving controller 114 receives the operation, the controller 14 controls the function to be executed in the following manner according to the operation received by the receiving controller 114. In the first exemplary embodiment, as described with reference to FIGS. 5 to 7, validity of a user operation is determined based on the direction (the angle of the fingertip) of the force applied to the touch panel 6 by the operator, and the operation direction by the operator. However, a characteristic feature in the second exemplary embodiment is that the function to be executed is controlled according to the direction (the angle of the fingertip) of force, and the operation direction by the operator.

For instance, in FIG. 8, a user touches an image of a multifunctional device on the touch panel 6 with a fingertip in a direction from the right. Thus, force in a leftward direction is applied to the image of a multifunctional device on the touch panel 6. The fingertip at this point is usually tilted to the right. The user moves the fingertip upward while maintaining the angle of the fingertip. When the detector 113 detects the direction (the angle of the fingertip) of the force, and the operation direction, the receiving controller 114 receives the operation because the corresponding operation has been set in the function control information. The controller 14 then refers to the function control information illustrated in FIG. 10, and recognizes that the operation of the user is an instruction to print on A4 size paper. Thus, the controller 14 requests printing on A4 size paper to a multifunctional device by issuing an instruction to the functional execution unit 13. A multifunctional device is connected to the information processing device 10 to allow communication via a relay device such as a hub, and thus can receive an instruction from the functional execution unit 13 and perform printing. It is to be noted that a file to be printed is designated beforehand, and the multifunctional device receives the file by some method.

Also, a user touches an image of a multifunctional device on the touch panel 6 with a fingertip in a direction from the right, and moves the fingertip leftward while maintaining the angle of the fingertip. When the detector 113 detects the direction (the angle of the fingertip) of the force, and the operation direction, the receiving controller 114 receives the operation because the corresponding operation has been set in the function control information. The controller 14 then refers to the function control information illustrated in FIG. 10, and recognizes that the operation of the user is an instruction to print double-sided. Thus, the controller 14 requests double-sided printing to the multifunctional device by issuing an instruction to the functional execution unit 13. In this manner, execution of the function may be controlled according to the direction (the angle of the fingertip) of force and the operation direction. In other words, setting may be made in the control function information such that a function is executed by a pair of the direction (the angle of the fingertip) of force and the operation direction.

Also, when a user touches an image of a multifunctional device on the touch panel 6 with a fingertip in a direction from the left, rightward force is applied to the touch panel 6. The user moves the fingertip in either direction while maintaining the angle of the fingertip which applies force in the leftward direction. In the setting example of the function control information, when the angle of the fingertip which applies force in the rightward direction is maintained regardless of the direction of movement of the fingertip by the user, a staple function is executed. In this manner, execution of the function may be controlled according to the direction (the angle of the fingertip) of force. In other words, setting may be made in the control function information such that a function is executed only by the direction (the angle of the fingertip) of force.

Also, when a user touches an image of a multifunctional device on the touch panel 6 with a fingertip in a direction from the bottom, upward force is applied to the touch panel 6. The user moves the fingertip upward while maintaining the angle of the fingertip which applies upward force. Thus, the controller 14 requests scanning to the multifunctional device by issuing an instruction to the functional execution unit 13. Meanwhile, the user moves the fingertip leftward while maintaining the angle of the fingertip which applies upward force. In the setting example of the function control information, no function is set for this condition. Therefore, the receiving controller 114 does not receive the operation because a corresponding operation is not set in the function control information. As a result, no function is executed by this user operation. Like this, setting may be made in the control function information such that no function is executed depending on an operation direction.

As illustrated to FIG. 9, in the case where images of a multifunctional device and a robot are displayed on the touch panel 6, when a user touches an image of a multifunctional device on the touch panel 6 with a fingertip in a direction from the bottom, upward force is applied to the touch panel 6. The user moves the fingertip to the image of a robot while maintaining the angle of the fingertip which applies upward force. The operation direction in this case is to be the robot image displayed on the screen. When the detector 113 detects the direction (the angle of the fingertip) of the force, and the operation direction, the receiving controller 114 receives the operation because the corresponding operation has been set in the function control information. The controller 14 then refers to the function control information illustrated in FIG. 10, and recognizes that the operation of the user is an instruction for coordination function 1 with the robot. Thus, the functional execution unit 13 instructs the multifunctional device and the robot to execute respective functions in a coordinated manner in accordance with an instruction from the controller 14. Thus, even with the same user operation of connecting the image of a multifunctional device and the image of a robot, different functions can be executed depending on the direction (the angle of the fingertip) of force applied by a fingertip.

As described above, in the exemplary embodiment, a function to be executed can be controlled by a pair of the direction of force and the operation direction for the information (image) displayed on the touch panel 6.

Figure 11:
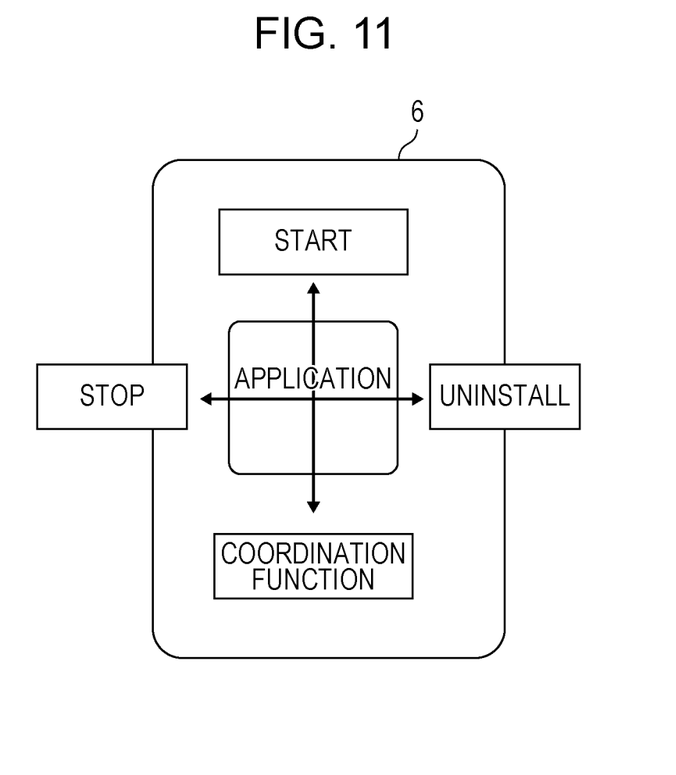
FIG. 11 is a view illustrating another example of a display screen when an image is displayed on the touch panel in the second exemplary embodiment.

In the exemplary embodiment, a description has been given using an example in which execution control of a function is performed based on an image of a multifunctional device as an example. However, for instance, as illustrated in FIG. 11, the exemplary embodiment is applicable to execution control of a function associated with an image of application. Although the coordination function has been described with reference to FIG. 9 using an example in which functions associated with different devices such as a multifunctional device and a robot are executed in a coordinated manner, the execution of a coordination function, in which the functions (for instance, a scan function and a print function of a multifunctional device) of a single device are coordinated, may be controlled. Also, functions associated with different devices (hardware) such as a multifunctional device and a robot are not coordinated, and the execution of a coordination function, in which a function associated with a device and a function associated with application (software) are coordinated, may be controlled.

Although a description has been given using an example of execution control of a function based on an operation of a fingertip (operator) of a user, a function to be executed may be controlled according to an operation using multiple operators (including the case where one user uses multiple operators and the case where multiple users use one or multiple operators). In the case of operations using multiple operators, execution of functions corresponding to the multiple operators may be controlled, or execution of one function corresponding to a combination of operations of the multiple operators may be controlled.

Although the function to be executed is controlled according to images (information) of a multifunctional device and a robot displayed on the touch panel 6, execution of the function may be controlled according to a position on the touch panel 6. For instance, the function to be executed may be controlled according to a user operation to a predetermined position (area) on the lower left of the screen.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the present disclosure and its practical applications, thereby enabling others skilled in the art to understand the present disclosure for various embodiments and with the various modifications as are suited to the particular use contemplated. It is intended that the scope of the present disclosure be defined by the following claims and their equivalents.

What is claimed is:

1. An information processing device comprising:
   a processor configured to function as:
      a receiving unit configured to detect a touch of a user, wherein the receiving unit receives the touch of the user and performs an operation based upon the touch of the user only when a direction of force applied to a display is a predetermined specific direction,
   wherein the receiving unit determines that the touch is invalid and does not perform the operation based upon the touch of the user when the direction of force applied to the display is in a direction other than the predetermined specific direction,
   wherein when a plurality of operations are performed on the display by the user, the receiving unit receives the plurality of operations only when the direction of force applied to the display from each of the plurality of operations is the predetermined specific direction,
   wherein the predetermined specific direction is set for each of a plurality of areas into which the display is divided, and
   wherein the predetermined specific direction is set to be different for a first of the plurality of areas as compared to a second of the plurality of areas.

2. The information processing device according to claim 1,
   wherein the receiving unit determines validity of an operation of a user by an operation direction of the user, in addition to the direction of the force.

3. The information processing device according to claim 2,
   wherein the receiving unit receives an operation of a user only when a combination of the direction of the force and the operation direction meets a predetermined condition.

4. The information processing device according to claim 2,
   wherein the receiving unit determines validity of an operation of a user by an operation position of the user with respect to the display.

5. The information processing device according to claim 1,
   wherein the receiving unit determines validity of an operation of a user by an operation position of the user with respect to the display.

6. The information processing device according to claim 1,
   wherein the predetermined specific direction is set according to information displayed on the display.

7. The information processing device according to claim 1,
   wherein the receiving unit determines validity of an operation of a user by an angle at which contact is made with the display when the operation is performed.

8. The information processing device according to claim 1, further comprising
   a control unit that controls a function to be executed according to an operation received by the receiving unit.

9. The information processing device according to claim 8,
   wherein the control unit controls a function to be executed according to the direction of force applied to the display in the received operation.

10. The information processing device according to claim 9,
    wherein the control unit controls a function to be executed according to the direction of the force and an operation direction of a user.

11. The information processing device according to claim 8,
    wherein the control unit controls a function to be executed according to a plurality of operations to the display by a user.

12. The information processing device according to claim 11,
    wherein the control unit controls execution of functions corresponding to the plurality of operations.

13. The information processing device according to claim 11,
    wherein the control unit controls execution of a function corresponding to the plurality of operations.

14. The information processing device according to claim 8,
    wherein the control unit controls execution of a function according to an operation position with respect to the display.

15. The information processing device according to claim 8,
    wherein the control unit controls a function to be executed according to information displayed on the display.

16. The information processing device according to claim 8,
    wherein the control unit controls a function to be executed according to an operation direction of a user to an image displayed on the display.

17. The information processing device according to claim 16,
    wherein the function is a coordination function utilizing a device corresponding to the image.

18. The information processing device according to claim 1, wherein the first plurality of areas is on a left side of the display and the predetermined specific direction for the first plurality of areas includes a rightward vector component, and the second plurality of areas is on a right side of the display and the predetermined specific direction for the second plurality of areas includes a leftward vector component.

19. A non-transitory computer readable medium storing a program causing a computer to execute a process, the process comprising:
- detecting a touch of a user;
- receiving the touch of the user and performing an operation based upon the touch of ft the user only when a direction of force applied to a display by the touch is a predetermined specific direction; and
- determining that the touch is invalid and not receiving performing the operation based upon the touch of the user when the direction of force applied to the display is in a direction other than the predetermined specific direction,
- wherein when a plurality of operations are performed on the display by the user, the receiving includes receiving the plurality of operations only when the direction of force applied to the display from each of the plurality of operations is the predetermined specific direction,
- wherein the predetermined specific direction is set for each of a plurality of areas into which the display is divided, and
- wherein the predetermined specific direction is set to be different for a first of the plurality of areas as compared to a second of the plurality of areas.

* * * * *